Aug. 8, 1967  J. R. BRAY ET AL  3,334,814
TEMPERATURE INDICATING CIRCUIT
Filed April 5, 1965
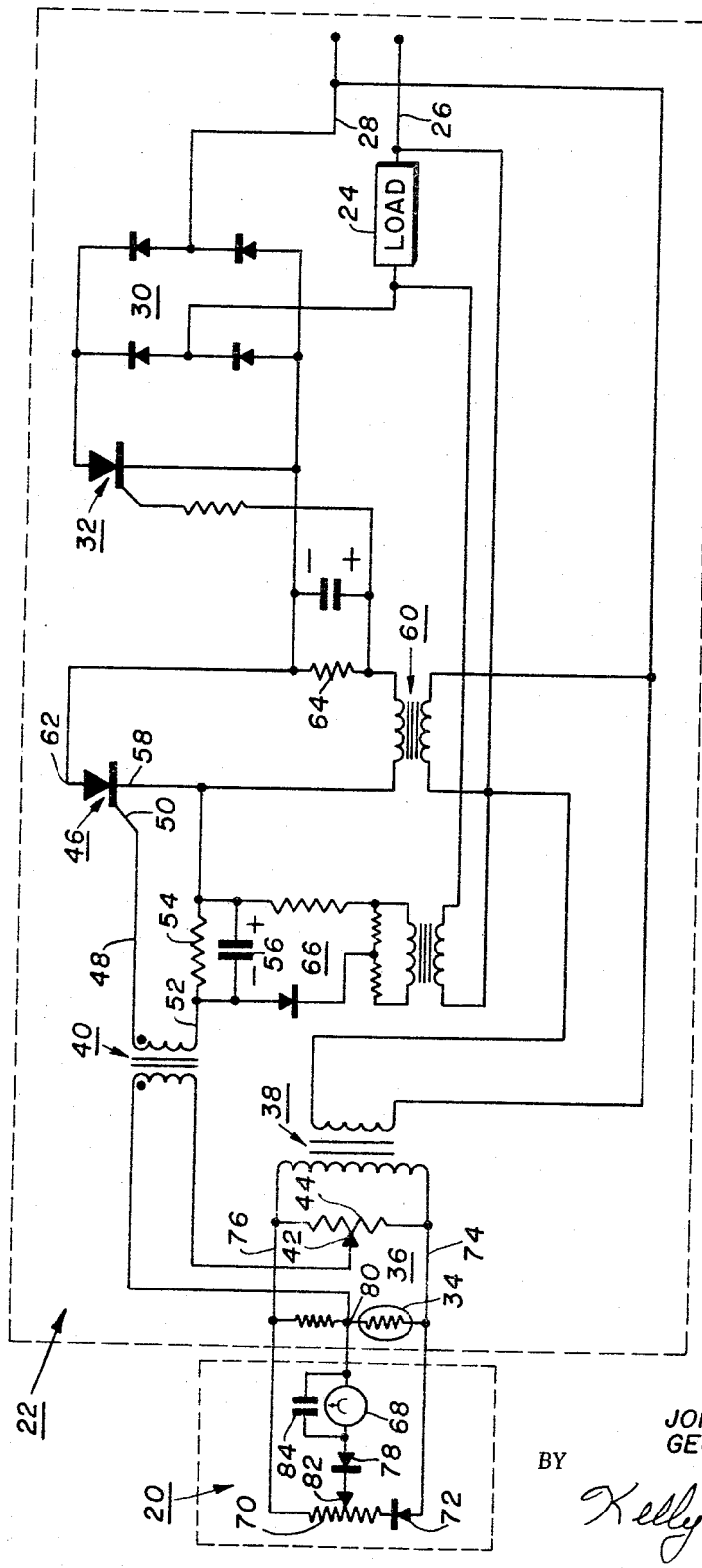
INVENTORS
JOHN R. BRAY
GEORGE B. PRICE
BY
Kelly O. Corley
ATTORNEY

United States Patent Office 3,334,814
Patented Aug. 8, 1967

3,334,814
TEMPERATURE INDICATING CIRCUIT
John R. Bray and George B. Price, Pensacola, Fla., assignors to Monsanto Company, St. Louis, Mo., a corporation of Delaware
Filed Apr. 5, 1965, Ser. No. 445,419
5 Claims. (Cl. 236—94)

This invention relates to a circuit for indicating deviations of the observed temperature from the desired or pre-set temperature, for example in a temperature controller in which temperature is sensed by a thermistor in an AC Wheatstone bridge circuit.

Many applications are known for an AC Wheatstone bridge temperature sensing circuit incorporating a thermistor in one leg, such as to provide a signal for a temperature controller. In the usual case, the bridge output voltage is a reasonably linear function of temperature, and the thermistor temperature can be derived by simply connecting an appropriately calibrated meter to the bridge output terminals. This approach cannot be used, however, when the bridge output voltage depends not only on the variation of the observed temperature from the set point (the desired temperature) but on other factors, such as variations in impedance presented to the bridge. For example, in a controller of the type disclosed in Bray et al. application 310,806, filed Sept. 23, 1963 now Pat. No. 3,240,916 of Mar. 15, 1966 and assigned to the assignee of the present invention, the input impedance presented by the temperature controller to the bridge output signal is periodically varied in a manner which is not proportional to the variation of observed temperature from set point. The bridge output voltage will vary as this impedance varies due to the bridge internal impedance, and is therefore not proportional solely to the temperature deviation. The needle of a meter connected across the bridge output terminals would therefore fluctuate in accordance with the periodic variations in impedance presented to the bridge by the controller. According to the present invention, an isolation circuit is added to the conventional bridge for isolating the meter from these variations in load impedance which occur in the temperature controller input circuit.

Accordingly, a primary object of the invention is to provide a temperature deviation indicating circuit for an AC Wheatstone bridge, which indicating circuit is substantially independent of variations in load impedance presented to the Wheatstone bridge, although the invention in its broader aspects is applicable to other combinations, as will be set forth below.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a more complete understanding of the nature and objects of the invention, reference should be had to the following detailed description taken in connection with the accompanying drawing, in which:

Referring now to the figure, isolation circuit 20 according to the present invention is shown as applied to a temperature controller 22 of the type described in the above-identified Bray et al. application, to which reference should be had for a detailed description of the operation of the controller per se. Briefly described, controller 22 includes a heater load 24, the temperature of which is to be maintained at a pre-determined level. Load 24 is supplied with alternating current on conductors 26 and 28. Conductor 26 as illustrated may be directly connected to one side of load 24, while conductor 28 is connected through diode bridge 30 to the opposite side of load 24 when silicon controlled rectifier (SCR) 32 is conductive. The temperature of load 24 is sensed by thermistor 34 placed in thermal contact with load 24 and connected in one leg of an AC Wheatstone bridge 36. Transformer 38 supplies power from conductors 26 and 28 to one diagonal of bridge 36, while the remaining diagonal of bridge 36 is connected to the primary winding of signal transformer 40. The bridge output signal is preferably derived from a variable tap 42 on potentiometer resistor 44, so that the bridge output signal level may be set as desired for any given temperature of load 24. This permits manual selection of the desired operating temperature or set point of load 24 by varying the setting of tap 42.

The bridge output signal appearing at the secondary winding of transformer 40 is applied to control a second SCR 46. As illustrated, one transformer terminal 48 is connected directly to the gate electrode 50 of SCR 46, while the remaining terminal 52 is connected through resistor 54 and capacitor 56 to cathode electrode 58 of SCR 46. Cathode 58 is connected to one side of transformer 60, while anode 62 is connected through a series resistor 64 to the opposite side of the secondary winding of transformer 60. Transformer 60 should be so poled that the voltage induced at terminal 48 is in phase with the potential appearing at anode 62 when the temperature of thermistor 34 is less than the set point temperature. The signal developed across resistor 64 when SCR 46 conducts is applied to the input circuit of SCR 32, which acts as a controlled diagonal switch across diode bridge 30.

Controller 22 further comprises a "feed back" network 66 for modifying the operation of the circuit so as to provide much closer control of the temperature of load 24. As is more fully described in the above noted Bray et al. application, whenever load 24 is energized by conduction of SCR's 32 and 46, power is supplied through network 66 to appear as an exponentially increasing reverse-bias on the input circuit of SCR 46. The signal supplied from bridge 36 can cause conduction of SCR 46 only when it exceeds the biasing voltage appearing across capacitor 56 by an amount exceeding the firing potential of SCR 46.

It should be noted that the operation of controller 22 requires bridge 36 to supply current through transformer 40 to initiate conduction of SCR 46, and that the impedance presented by SCR 46 to bridge 36 varies not only according to the instantaneous polarity and amplitude of the signal output of bridge 36, but also according to the instantaneous amplitude of the reverse-biassing signal supplied by bridge 36 through transformer 40 only during the half-cycles when conductor 48 is positive with respect to conductor 52, since the input impedance of SCR 46 is extremely large when conductor 48 is negative with respect to conductor 52 due to the asymmetrical conductivity of the path between 50 and cathode 58. In other words, bridge 36 is "loaded" by SCR 46 only on power supply half-cycles of one polarity, and is substantially unaffected by SCR 46 during power supply half-cycles of the opposite polarity.

Isolation circuit 20 according to the present invention takes advantage of this latter fact by effectively connecting DC meter 68 to bridge 36 only during the half-cycles when SCR 46 is not conducting. Thus an additional branch, including serially connected potentiometer 70 and isolating diode 72, is connected across secondary winding terminals 74 and 76 of transformer 38. Meter 68 is connected in series with rectifier diode 78 between junction 80 and movable tap 82 on potentiometer 70. Capacitor 84 bypasses AC components around meter 68. Diodes 72 and 78 are poled to pass current only during periods when bridge 36 is not loaded by SCR 46; in the illustrated embodiment these periods are during the half-cycles when terminal 80 is positive with respect to terminal 76. Tap 82 may be adjusted to return the needle of meter 68 to a predetermined reference or zero position for any given set point temperature of thermistor 34.

It should be noted that similar isolation of the meter from impedance variations presented to bridge 36 may be achieved without using the precise isolation circuit illustrated. Thus diode 72 and potentiometer 70 may be eliminated if the anode of diode 78 is connected to terminal 76 through a variable resistor. Similarly, diode 72 and potentiometer 70 may be eliminated if the cathode of diode 78 is connected to meter 68 and the anode of diode 78 is connected to terminal 74 through a variable resistor. However, the illustrated configuration affords greater flexibility, and is the preferred embodiment.

While the invention has been specifically disclosed in the context of a temperature deviation indicator as applied to a particular temperature controller, the broad principles, by which isolation of the meter from variations in loading of the signal source is achieved, are applicable to other environments. Thus, the signal source itself may include a photodiode or other transducer rather than a thermistor and may respond to parameter other than temperature or light if desired. It is not essential to all aspects of the invention that the signal source be a Wheatstone bridge, although this is the preferred signal source configuration.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Parameter deviation indicating means comprising in combination:
   (a) an AC signal source producing an AC signal having an amplitude proportional to a sensed parameter;
   (b) an asymmetrically conductive load impedance coupled to said source whereby current flows in said load impedance only during signal half-cycles of a given polarity;
   (c) parameter indicating means comprising:
      (1) a DC meter,
      (2) and circuit means coupling said meter to said source, said circuit means including a series rectifier poled to pass current only when said AC signal is of opposite polarity to said given polarity.

2. The combination defined in claim 1, wherein said parameter is temperature.

3. Temperature deviation indicating means comprising, in combination:
   (a) AC power supply terminals;
   (b) first and second impedance connected in series across said power supply terminals and having a first intermediate junction point, at least said first impedance having an impedance value which varies with temperature;
   (c) third and fourth impedances connected in series across said power terminals and having a second intermediate junction point;
   (d) an asymmetrically conductive load impedance coupled between said first and second intermediate junction points whereby current flows in said load impedance only during power supply half-cycles of a given phase;
   (e) a DC meter;
   (f) and circuit means coupling said DC meter to said first intermediate junction and to one of said power supply terminals, said circuit means including a series rectifier poled to pass current only when said power supply is of opposite phase to said given phase.

4. Temperature deviation indicating means comprising, in combination:
   (a) AC power supply terminals;
   (b) first and second impedances connected in series across said power supply terminals and having a first intermediate junction point, at least said first impedance having an impedance value which varies with temperature;
   (c) third and fourth impedances connected in series across said power terminals and having a second intermediate junction point,
   (d) an asymmetrically conductive load impedance coupled between said first and said second intermediate junction points whereby current flows in said load impedance only during power supply half-cycles of a given polarity;
   (e) and means for indicating deviation of the temperature of said first impedance from said set point, comprising:
      (1) a DC meter,
      (2) and circuit means coupling said DC meter to said first intermediate junction and to one of said power supply terminals, said circuit means including a series rectifier poled to pass current only when said power supply is of opposite polarity to said given polarity.

5. Temperature deviation indicating means for a temperature controller, comprising, in combination:
   (a) AC power supply terminals;
   (b) first and second impedances connected in series across said power supply terminals and having a first intermediate junction point, at least said first impedance having an impedance value which varies with temperature;
   (c) third and fourth impedances connected in series across said power terminals and having a second intermediate junction point;
   (d) control means for maintaining said first impedance at a substantially constant setpoint temperature, said control means including an asymmetrically conductive load impedance coupled between said first and said second intermediate junction points whereby current flows in said load impedance only during power supply half-cycles of a given polarity;
   (e) and means for indicating deviation of the temperature of said first impedance from said setpoint, comprising:
      (1) a DC meter,
      (2) and circuit means coupling said DC meter to said first intermediate junction and to one of said power supply terminals, said circuit means including a series rectifier poled to pass current only when said power supply is of opposite polarity to said given polarity.

References Cited

UNITED STATES PATENTS 2,781,505  2/1957  Grant.
3,240,916  3/1966  Bray et al. _____ 219—501

FOREIGN PATENTS 961,019  1/1964  Great Britain.

LOUIS R. PRINCE, *Primary Examiner.*

F. SHOON, *Assistant Examiner.*